May 3, 1960 W. D. CARRIE 2,934,942
VALVE TESTING APPARATUS
Filed April 30, 1956 5 Sheets-Sheet 2

Inventor:
William D. Carrie.

May 3, 1960 W. D. CARRIE 2,934,942
VALVE TESTING APPARATUS
Filed April 30, 1956 5 Sheets-Sheet 3

Inventor.
William D. Carrie.
By Joseph O. Lange
Atty.

May 3, 1960  W. D. CARRIE  2,934,942
VALVE TESTING APPARATUS
Filed April 30, 1956  5 Sheets-Sheet 5

Inventor.
William D. Carrie.
By Joseph O. Lange
Atty.

United States Patent Office 2,934,942
Patented May 3, 1960

2,934,942

VALVE TESTING APPARATUS

William D. Carrie, Lisle, Ill., assignor to Crane Co., Chicago, Ill., a corporation of Illinois Application April 30, 1956, Serial No. 581,703

12 Claims. (Cl. 73—46)

The present invention relates to a pressure testing apparatus for valves and like hollow open-ended articles, and more particularly to such apparatus accommodating a wide range of valve sizes adapted to maintain a valve tightly sealed against the testing pressure by relatively light sealing pressure preventing distortion of the valve parts.

In pressure testing of valves and similar articles, testing fluid under pressure is introduced into the interior of the valve or like article and maintained therein for a time sufficient to ascertain the valve condition. This requires that the ends be closed except for testing fluid inlet and/or outlet means, and sealed with sufficient pressure to resist gapping or separation between the valve and the end closure means, due to the testing pressure. Since the valves may be provided for high pressure service, and tests are usually made at several times the rated pressure, the total pressure acting to separate the end closures from the valve, especially in larger valves, may reach the magnitude of many tons. If the end closures are secured to the valve flanges by bolts, C-clamps, or the like, a laborious and time-consuming test set-up procedure is involved, resulting in an inefficient and costly operation. If a press arrangement is employed to clamp the end closures on the valve, the clamping pressure required to hold the closures in sealed relation against the testing pressure, especially when necessary allowance is made for elongation and/or compression of the press structure, is so great that the valve is apt to be deformed and distorted, particularly at the valve seat, and thus rendered unfit for service.

The present invention provides fluid operated means for clamping a valve between end closing and sealing means under relatively light pressure insufficient to cause any distortion of the valve, and at the same time utilizing the testing pressure for effecting a following of relative valve movement due to compression or lengthening of the apparatus, so as to prevent gapping at the sealed ends of the valve and maintain the seals tight against leakage of the testing fluid. The apparatus makes provision for accommodating valves of internal diameters varying through a wide range, and is adapted to operation on various types of valves, thus lending itself readily to use in the production of valves of many different kinds and sizes.

It is accordingly an important object of this invention to provide means for pressure testing of valves and the like which positively seals against escape of testing pressure without application of distorting pressure on the article tested.

Another object is the provision of apparatus for pressure testing of valves and the like of a wide range of sizes and types and at any desired pressure.

A further object is the provision of valve pressure testing apparatus applying a follow-up clamping pressure to maintain the valve ends sealed against escape of testing pressure.

Another object is the provision of apparatus for pressure testing of valves which applies a follow-up sealing pressure by expansible chamber means of effective area selectively variable in accordance with the size of a valve under test.

It is also an object of the invention to provide apparatus for pressure testing of valves which includes auxiliary apparatus for operation with smaller size valves.

Other and further objects of the invention will be apparent to those skilled in the art from the following description and the accompanying drawings, in which.

Figure 1:
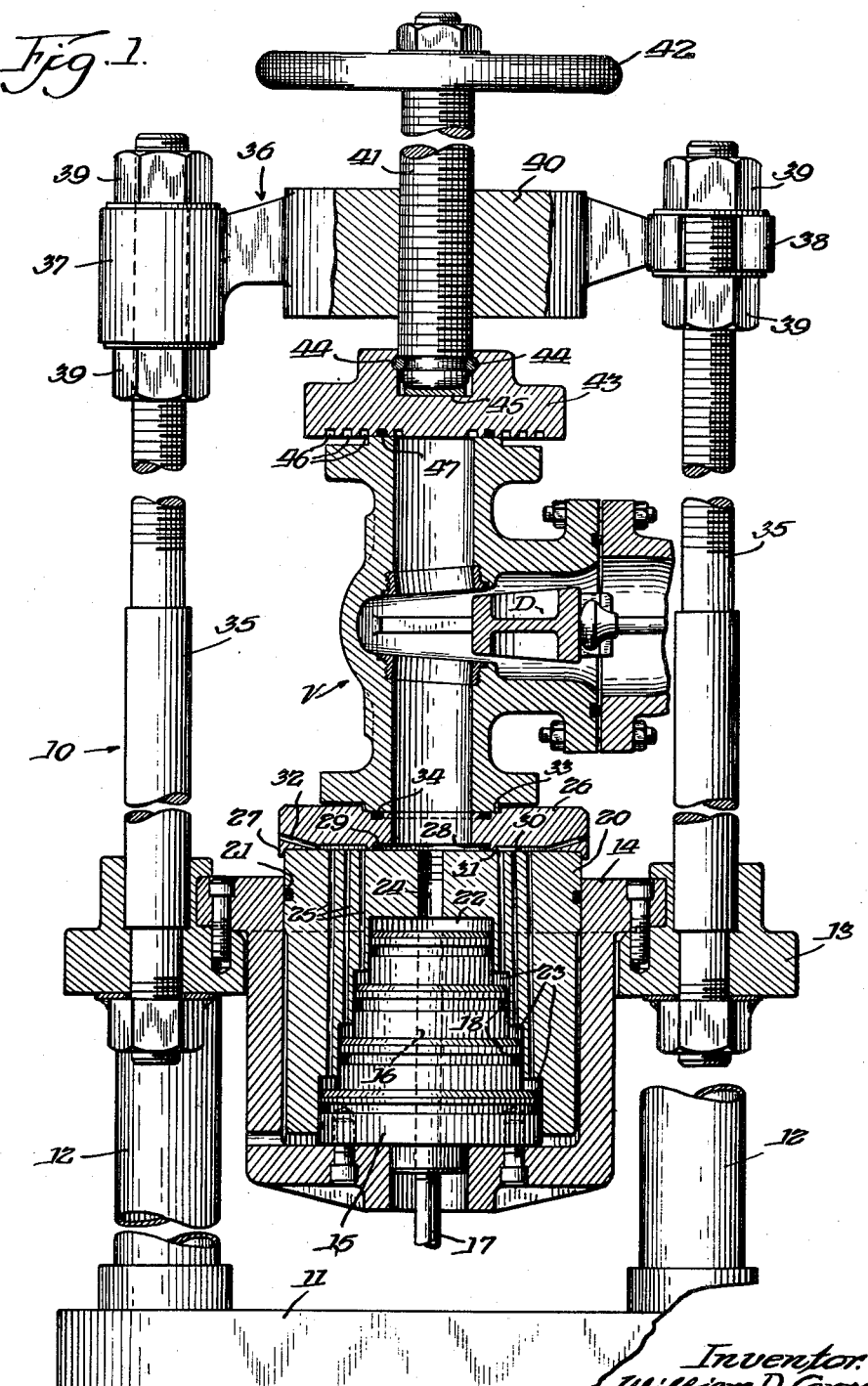
Fig. 1 is an elevation, partly in section, of apparatus embodying the invention.
Figure 2:
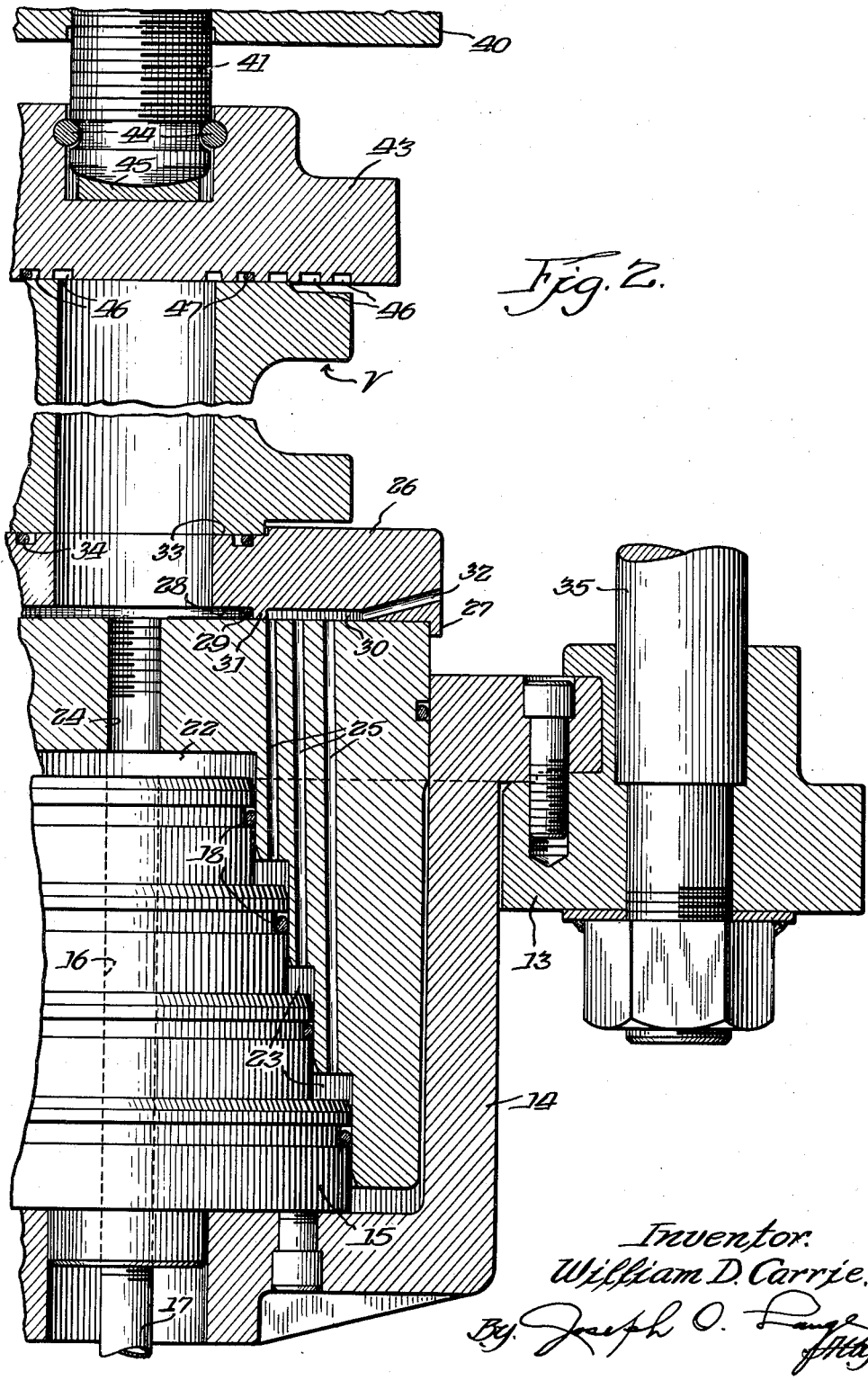
Fig. 2 is an enlarged fragmentary vertical sectional view of a portion of Fig. 1.
Figure 3:
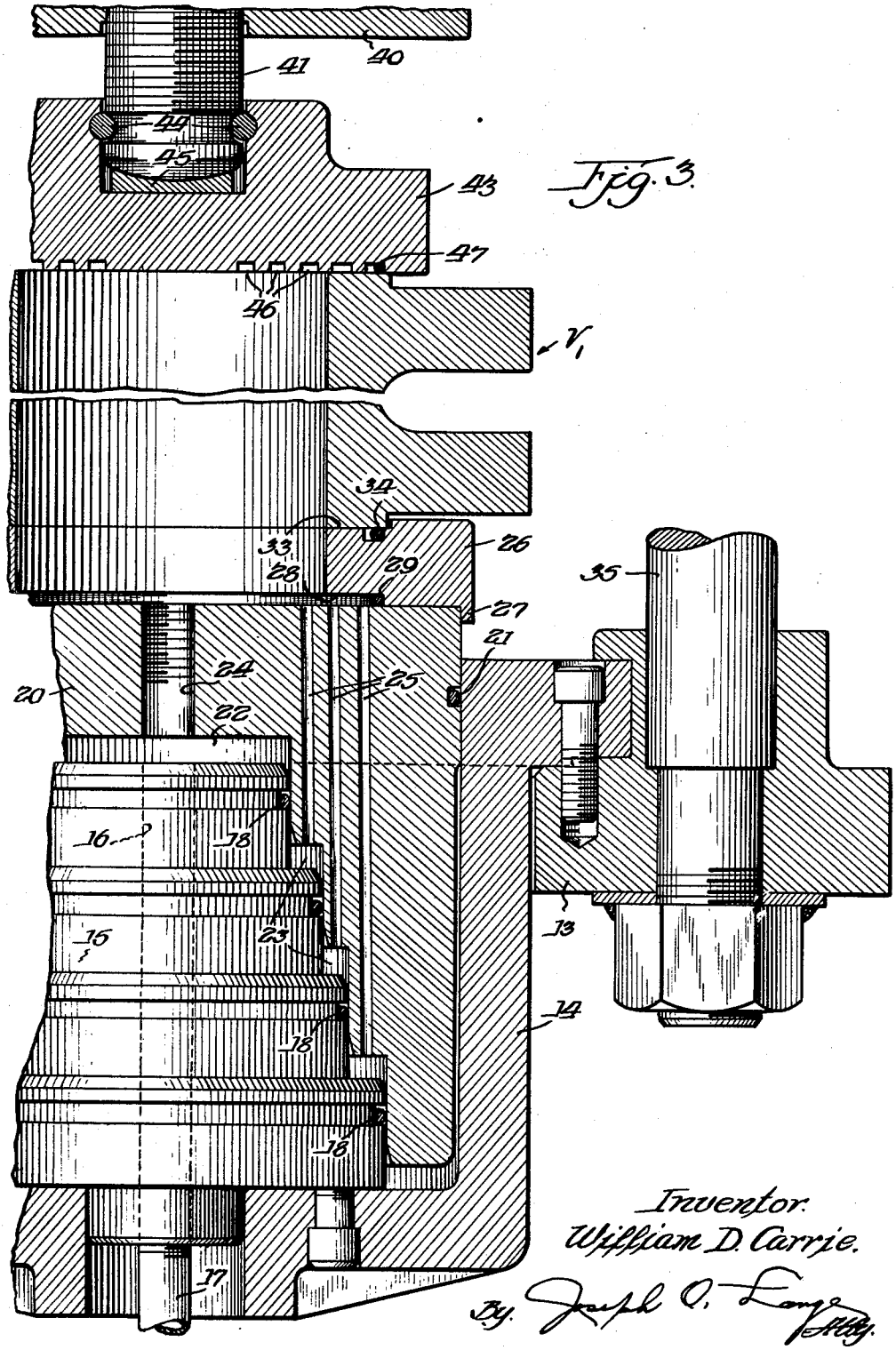
Fig. 3 is a view similar to Fig. 2, but showing the apparatus as used with a larger valve.

Referring particularly to Figs. 1 to 3 of the drawings, there is shown a valve testing apparatus 10 according to this invention, which comprises a base 11 from which pedestals 12 extend upwardly to support a table 13 having a central aperture to accommodate a cylindrical housing 14 which is open at its upper end and flanged thereabout to overlie the table for securement thereto by bolts or similar means. Fixed to the closed lower end of the housing is a stepped piston 15, the stepped portions successively decreasing in diameter from the lower or fixed end of the piston to its upper end. A fluid passage 16 is formed through the piston and opens through the reduced upper end thereof. A pipe or other conduit 17 connects with the passage 16 at the lower end of the piston and leads to a suitable source of testing fluid under pressure. O-rings 18 are provided on the cylindrical surfaces of the stepped portions to seal with the cylinder presently described. Disposed in the housing 14 is a fluid cylinder 20 which is reciprocable in the housing and on the piston 15, a suitable seal ring 21 being provided between the cylinder and housing. The cylinder has an internal step formation corresponding to that of the piston, the stepped portions of the piston and cylinder defining a series of expansible and contractible chambers. The chamber 22 defined at the upper or reduced end of the piston is cylindrical, while annular chambers 23 are defined at the other portions. The end wall of the cylinder 20 has an opening 24 therethrough, preferably axially aligned with the piston passage 16, and serving as a port for the chamber 22. Each of the chambers 23 has at least one passage or port 25 extending through the end wall, the port opening of each chamber lying within the axial projection of that chamber on the cylinder end wall and outside of the projection of the chamber of next smaller diameter.

An annular ported adapter plate or platform 26 is provided to engage on the end wall of the cylinder and receive one end of a valve V which is to be tested. The aperture of the plate 26 is preferably of substantially the same diameter as the internal diameter of the valve, although it may vary. The plate 26 is provided with a flange 27 or like means to engage the exterior of the cylinder and thus prevent lateral displacement of the adapter. In the face of the adapter plate adjacent the end wall of the cylinder 20 and about the aperture, there is formed a recess 28 providing a space for an O-ring 29 to seal between the plate and the cylinder. As shown in Figs. 1 and 2, this recess is of a diameter somewhat smaller than that the chamber 22, but may, if desired, be formed of a diameter slightly smaller than that of any of the chambers 23. The cylinder-adjacent face of the plate is also provided with an annular channel or relief 30 defined from the recess 28 by a land 31 and of such radial extent as to overlie the port openings radially outwardly of the port or ports encompased by the recess 28. A vent or vents 32 may open the relief to atmosphere. In the other face of the adapter plate 26, there is formed a depression 33 to receive the end of the valve, with an O-ring 34 therein to seal between the valve and the adapter. The depression 33 is similar to the recess 28 in that it extends about the aperture of the adapter and has a diameter slightly smaller than that of one of the chambers 22 or 23, in Figs. 1 and 2 the chamber 22 and in Fig. 3 the chamber 23 of largest diameter. Extending vertically from the table 13 are a pair of uprights, the upper end portions of which are threaded to carry a cross head member 36 vertically adjustable thereon. The cross head member is provided at one end with a hub 37 engaged on one of the uprights, and at the other with a slotted or hook-like portion 38 which may engage with the other upright. The cross head member is adjusted along the height of the uprights by means of a pair of nuts 39 on each upright, one above and one below the cross head member, which also lock or release the hook portion 38 relative to its associated upright 35. The central portion of the member 36 is formed as a block 40 which has a threaded vertical aperture therethrough in which works a screw 41 rotatable by means of a handwheel 42 thereon, and to the lower end of which below the block portion is secured a top plate 43. The securement of the top plate to the screw is preferably such as to allow relative rotation thereof as well as some play in the vertical plane. In the present case, the plate 43 has a recessed hub or boss receiving the screw, and is secured by pins 44 passed through the boss engaging in a circumferential groove of the screw. A spherical washer 45 in the recess of the boss provides a bearing for the rounded end of the screw. The lower face of the top plate is provided with a plurality of concentric grooves 46, each of somewhat greater diameter than the end aperture of one size of valve V to be tested on the apparatus, and an O-ring 47 is received in that one of these grooves corresponding to the valve size so as to seal between the valve and plate 43.

In the present instance, the valve V is shown as a gate valve with a wedge type disk D, and for clearness is illustrated as horizontally rotated out of the actual position it would occupy in the apparatus. The valve is subjected to a shell test for flaws in the walls or shell of the valve, and also to a seat test for leakage past the seats and disk when the valve is closed. In operation an adapter plate 26 which corresponds generally to the size of the particular valve to be tested is chosen and placed on the end wall of the cylinder 20 in its lowermost position, the cross head member 36 being swung out of its cross position. The valve V is then disposed with one end in the depression 33 of the adapter plate 26 and its other end adjacent the plane of the top plate 43. The cross head member 36 is then adjusted, if necessary, to a height such as to bring the top plate somewhat above the upper end of the valve and then swung to position with its hook portion 38 engaging with the upright 35, and locked against retraction by tightening of the nuts 39. Rotation of the handwheel 42 then results in the top plate clamping against the upper end of the valve in close sealing relation, but at a pressure insufficient to distort the valve. With the valve in open condition, the testing fluid under pressure is introduced through the conduit 17 and passes into the expansible chamber 22 through the passage 16 and into the interior of the valve through the aperture or port 24 and the aperture of the adapter plate 26. Assuming that the valve is of relatively small size and that the adapter plate therefore has its recess 28 of somewhat smaller diameter than the chamber 22, as shown in Figs. 1 and 2, it will be evident that only the chamber 22 will be in communication with the interior of the valve and the area defined by the O-ring 29 on the cylinder end wall subject to the pressure of the fluid in the valve, and that the other chambers 23 will merely be open to atmosphere through the port passages 25. The differenece in area between the chamber 22 and the recess 28 results in a differential pressure of the fluid on the opposite faces of the end wall moving the cylinder and adapter plate 23 toward the top plate 43 so as to maintain tightly sealed relation between the valve and the plates 26 and 43, as well as between the cylinder and the adapter plate, despite any elongation of the uprights 35 or compression of the top plate 43 or yielding of the cross head member 36 due to the effect of the pressure of the testing fluid. Thus there is no danger of a blowout or escape of the testing fluid, even though the total pressure acting on the top plate 43 may amount to several tons. If no leaks or other flaws are disclosed by the shell test, the valve may be subjected to the seat leakage test, the testing fluid being withdrawn through the conduit 17 and the gate disk D of the valve being moved to closed position on the seats. The testing fluid is then again applied to the interior of the valve, acting against the face of the disk adjacent the cylinder and resulting in leakage of fluid between the disk and lower seat if either the seat or disk is not properly formed. The same test may then be applied to the other seat by withdrawing the fluid and releasing and reversing the valve.

In Fig. 3, a valve VI, considerably larger than the valve V, is shown as in testing position on the apparatus 10. In this case, the adapter plate 26 has a relatively large aperture to correspond to the interior diameter of the valve, and the recess 28 is of a diameter slightly less than that of the largest stepped portion of the piston, or in other words, of the chamber 23 of greatest diameter. The ports 25 of all the chambers 23 as well as the port 24 of the chamber 22 are thus in communication with the interior of the valve, so that fluid pressure in the valve acts not only in the chamber 22 but in all of the chambers 23. In effect, the piston area is increased to a maximum. The adapter plate 26 in this case obviously does not require any venting arrangement for the port passages of the expansible chamber. The operation of the apparatus in this case is substantially the same as in the case of the smaller valve, there being again a differential pressure urging the cylinder 20 to maintain a tight seal at the ends of the valve and between the adapter plate and cylinder, regardless of any elongation or compression of any parts of the apparatus which might tend to allow a gap to occur.

It will be understood that the area defined on the outer face of the end wall of the cylinder is only slightly less than the total cylinder area made effective by means of the particular adapter plate 26 by means of the recess 28 with its O-ring seal 29, and the resulting difference in pressure thus is only slightly more than sufficient to overcome the weight of the valve. There is, therefore, no danger of causing distortion of the valve body or any part thereof by the clamping pressure, no matter how high the testing pressure may be.

Two adapter plates 26 in addition to and intermediate the two shown in Figs. 2 and 3 are provided, one opening the chamber 23 of smallest diameter and the chamber 22 to the interior of the valve, and the other opening the chamber 22 plus the two chambers 23 of smallest diameter to the valve interior, the recesses 28 and depressions 33 in each case being of slightly smaller diameter than that of the largest diameter chamber placed in communication with the valve under test. That is, interchangeable plates 26 are provided corresponding to the different effective cylinder means areas which may be employed for particular sizes of valves, and serving as means for selecting the desired effective area.

Figure 4:
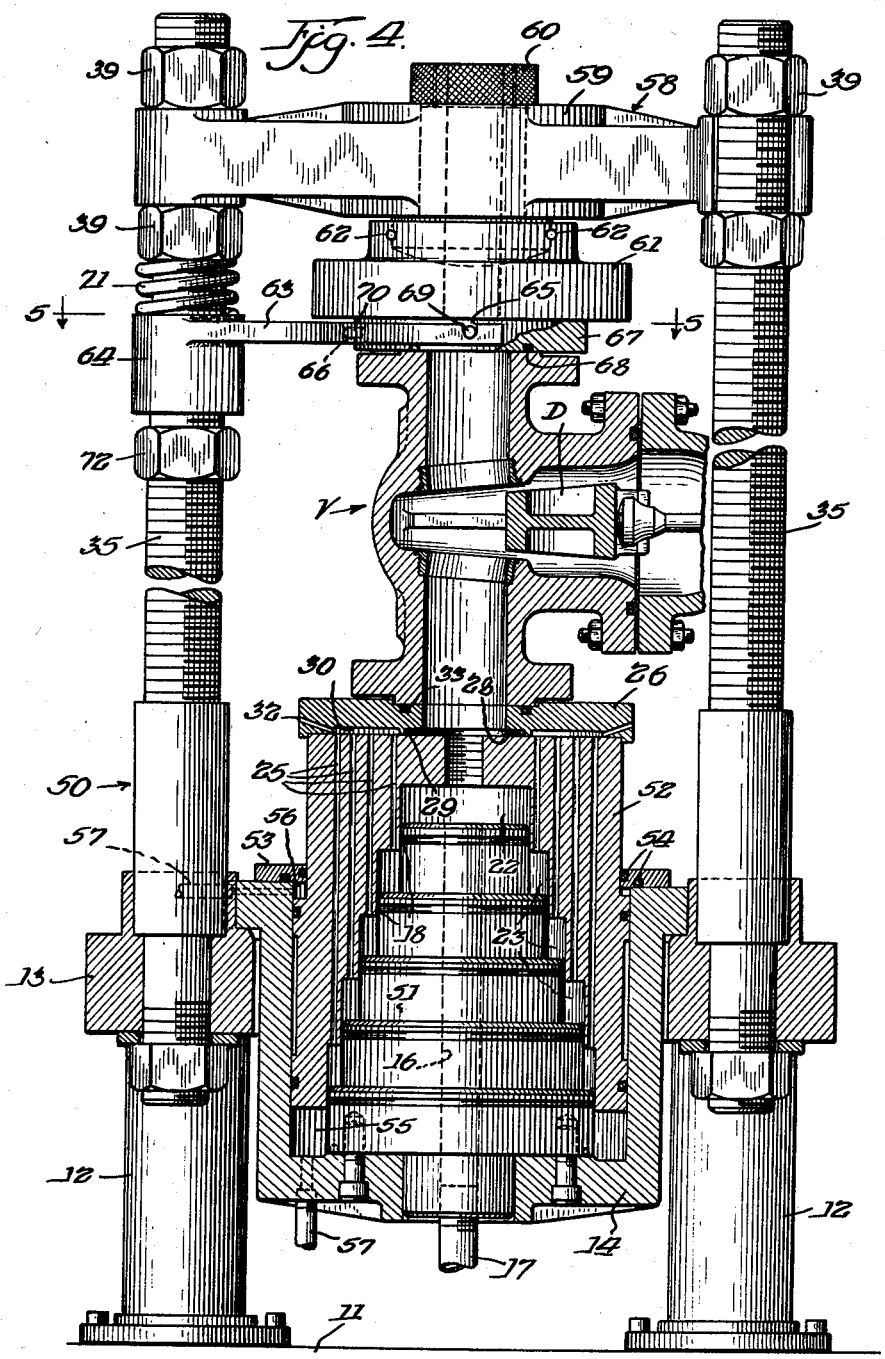
Fig. 4 is a view similar to Fig. 1, but showing a somewhat different apparatus.

In Fig. 4, there is shown a valve testing apparatus 50 which is generally similar to the apparatus 10 but differs in some respects. The apparatus 50 comprises pedestals 12 secured to a base 11 and supporting a table 13 on which is mounted a cylinder housing 14, all substantially similar to the corresponding parts of the apparatus 10 already described. A stepped piston 51 is secured in the housing, and a cylinder 52 internally stepped to cooperate with the stepped portions of the piston to define the chambers 22 and 23 sealed by O-rings or similar means 18 is reciprocally mounted on the piston within the cylinder. The lower portion of the cylinder 52 within the housing is enlarged and provided with seal rings 21. A closure plate 53 secured to the open end of the housing engages the narrower portion of the cylinder, appropriate sealing means 54 being provided to make a suitably tight seal with the cylinder and with the end surface of the housing. The lower end of the cylinder, the piston, and the housing define an annular expansible and contractible chamber 55, while a similar chamber 56 is defined within the upper end of the housing by the plate 53, the cylinder and the housing. Each of these chambers has a conduit 57 opening thereto which by means of any appropriate arrangement may exhaust and supply air or other fluid under pressure to and from the chambers 55 and 56 so that the cylinder 52 may be raised or lowered within the housing. It will be noted that the stepped portions of both the cylinder and piston are higher or of greater axial extent than in the case of the piston 15 and cylinder 20 previously described, in order to accommodate this movement of the cylinder and also to allow for any follow-up clamping movement of the cylinder which may be effected by the valve testing fluid. In this case, also, one more stepped portion is shown than in the apparatus 10.

Figure 5:
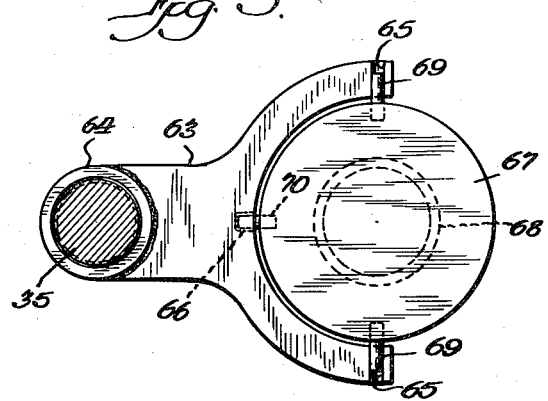
Fig. 5 is a horizontal sectional view taken substantially as indicated by the line 5—5 of Fig. 4.

The adapter plate 26 is provided as in the apparatus 10 to receive one end of the valve V, and may vary as previously described in accordance with the different valve sizes. The uprights 35 threaded at their upper portions are provided as in the case of the apparatus 10, and a cross head member 58 similar to the cross head member 36 in having a hub at one end and a hook portion at the other is adjustably mounted on the uprights, the nuts 39 being provided to secure and release the cross member at desired adjusted position along the height of the uprights. The cross head member has a central boss 59 which has a vertical opening therethrough in which is received a sleeve 60 on the lower end of which is secured a pressure plate 61. The pressure plate is generally similar to the top plate 43, and may similarly be secured in rotatable and slightly rockable relation on the sleeve by means of pins 62 inserted in its hub engaging in a peripheral groove on the sleeve. The plate 61 has a substantially flat lower face and does not itself seal the end of valve V. The plate has an aperture therethrough registering with the bore of the sleeve 60 so as to provide a sight opening through which the interior of the valve may be viewed under certain conditions. Disposed below the pressure plate is a carrier 63, for a top adapter plate hereafter described, mounted for pivotal movement in a horizontal plane on one of the uprights 35 by means of a hub 64 so that it may be swung into and out of position between the plate 61 and the upper end of the valve V. As best shown in Fig. 5, the carrier is of yoke form and has a portion connected to the hub and a generally semi-circular portion provided with a pair of aligned slots 65 in the opposite arms of the semi-circular portion. A hole 66 is formed in the connecting portion, intermediate the slots. An adapter plate 67 is provided with a groove or grooves in its lower face to receive an O-ring 68 or other appropriate sealing means for sealing engagement with the end of the valve V. The adapter plate has a pair of diametrically opposed pins 69 projecting from its edge to engage in the slots 65 of the carrier, and has a third pin 70 which engages in the hole 66 with a loose fit so that the plate may have a certain amount of play for adjustment between the valve and pressure plate. In the present case, the carrier is normally urged downwardly away from the pressure plate by means of the spring 71 engaging between the carrier hub 64 and the lower nut 39 holding the cross member 58. Downward movement of the carrier is limited by a nut 72 on the upright 35 below the hub 64.

The apparatus 50 is operated in much the same manner as the apparatus 10, a valve V being disposed on the lower adapter plate 26 on the cylinder 52, and the cross head member 58 being adjusted so that the pressure plate 61 is somewhat farther above the upper end of the valve than the thickness of the carrier 63 and top adapter plate 67, and the carrier itself being adjusted to slightly above the level of the upper end of the valve in lowered position. The end adapter plate 67 is disposed in the carrier by inserting the pin 70 into the hole 66 and lowering the pins 69 into the slots 65, the carrier and plate being positioned over the upper end. Air under pressure is then admitted to the chamber 55 of the cylinder housing 14, while the chamber 56 is open to exhaust, so that the cylinder 52 is moved upwardly and clamps the valve between the plates 43 and 67, the latter being moved upwardly together with the carrier 63 by the valve until engagement with the pressure plate 61. It is to be understood that the clamping pressure thus applied to the valve is relatively light, the air being under a pressure preferably not exceeding 100 p.s.i. With the valve thus held in testing position, the testing fluid may be introduced and the air then released from chamber 55 if desired. When the testing fluid is introduced through the conduit 17 into the interiors of the cylinder and of the valve, the maintenance of a seal is automatically carried out as already described in connection with the apparatus 10. When the test is completed, the testing fluid is exhausted, and the valve lowered with the cylinder 52 either by gravity or by introduction of air under pressure into the chamber 56, in either case with the pressure in chamber 55 relieved. Upon lowering of the valve, the carrier 63 moves the plate 67 downwardly from the plate 61. When a seat test is to be carried out, the valve disk D is closed, and the carrier and top adapter plate are swung out of the way, the cross head member 58 and pressure plate being suitably adjusted so that the upper end of the valve engages the pressure plate. No seal is required between the plate 61 and the valve, since the pressure fluid is required only in the lower half of the valve. The upper half of the valve interior is open to view through the sight opening provided by the sleeve 60 and plate 61, facilitating observation of the test. The seat test is carried out substantially as described in connection with the apparatus 10. It will be evident that if desired the screw 41 of apparatus 10 may be tubular, like the sleeve 60, and employed with an apertured clamping plate for viewing the interior of a valve.

Figure 6:
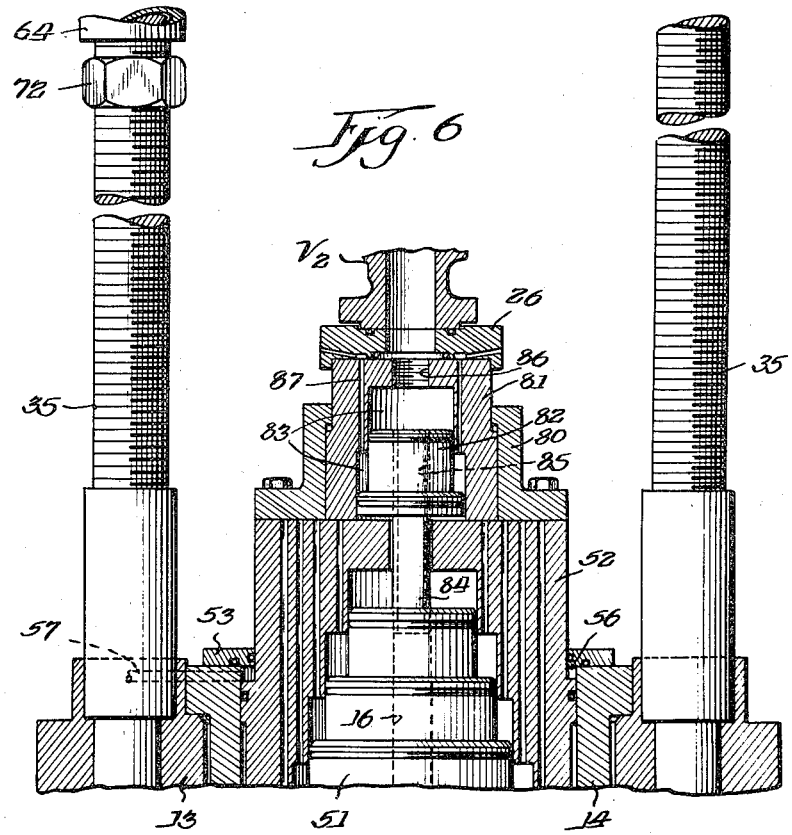
Fig. 6 is a fragmentary elevational view illustrating auxiliary apparatus according to the invention as employed with the apparatus of Fig. 4 for accommodation of small size valves.

In Fig. 6, there is shown an auxiliary arrangement for adapting either the apparatus 10 or 50 to operation on smaller valves than those otherwise readily accommodated thereby without requiring an inconveniently high structure. This auxiliary arrangement is shown as applied to the apparatus 50, but it will be obvious that it may just as readily be employed with the apparatus 10. A cylinder housing 80 of generally cylindrical open-ended form is secured by a bottom flange to the end wall of the cylinder 52, and receives therein an auxiliary cylinder 81 which has an internal step formation corresponding to an auxiliary piston 82 which has stepped portions cooperating with the interior of the cylinder to define expansible and contractible chambers 83. The piston 82 is fixed on the piston 51 in vertically spaced relation thereto by a nipple or similar rigid passaged means 84 which extends through the opening 24 in the end wall of floating cylinder 52 and is threadedly or otherwise secured to the pistons 51 and 82 in communication with the fluid passage 16 through the piston 51 and with a similar passage 85 through piston 82. The lower end of the piston 82 is preferably spaced sufficiently from the piston 51 so as not to be engaged by the end wall of the cylinder 52 in its fully projected position, but the lower or open end of the cylinder 81 is engageable with the cylinder 52. The end wall of the cylinder 81 has a central aperture 86 for communication with the interior of a valve V2, and this aperture serves as a port for the cylindrical chamber defined at the end of the piston 82. Port passages 87 extend from the other chambers 83 and open through the end wall of the cylinder 81 in the same relation to the projections of the chambers as has been described in connection with the apparatus 10 and 50. In the present case, only two chambers are shown as provided by the auxiliary construction, but it will be obvious that more can be employed if desired. An adapter plate 26 similar to those already described but of smaller proportions, is provided on the end wall of the cylinder 81 to receive one end of the valve V2, the other end of the valve being engaged and received by means similar to the top plate 43 or the plate 67 cooperating with the pressure plate 61.

In operation, when relatively small valves are to be tested, the auxiliary construction described is secured on the cylinder of the testing apparatus, and either the clamping screw 41 with its plate 43 is employed to clamp the valve in sealed relation, or the cylinder 52 is raised by air pressure to urge the valve against the plate 67. Testing fluid under the desired pressure is then introduced through the passage 16 of piston 51 and the rigid passage means 84 and passage 85 into the upper chamber 83 of the auxiliary piston and cylinder, and through the central aperture or port 86 into the interior of the valve. If a somewhat larger valve is tested, the adapter plate 26 is replaced by one which allows communication of the other chamber or chambers with the interior of the valve in the manner already explained, and the plate 67 if employed may similarly be replaced by another, if necessary.

While gate valves have been shown in the drawings as under test, it is to be understood that this is by way of example only, since many other types of valves may be tested with the apparatus disclosed. In addition, each of the adapter plates can accommodate more than one size of valve, at least with valves having types of ends in which the portion engaging with the sealing means of the adapter plate is of such form and extent that through a given range of sizes it will make sealing contact with sealing means of a given size. One example of this type of valve end is the raised or male face end illustrated on the valves of the drawings. While the adapter plates are shown as formed for receiving such raised face ends, it will be apparent that they may readily be modified to receive other forms of ends, such as ring joint ends or welding ends, for example, and such plates may be provided in addition to those specifically shown and described. It should go without saying that the adapter plates, in addition to determining the area of the cylinder means made effective for the follow-up clamping of the valve, act in effect as means for sealing between the valve end and the cylinder or the pressure plate, and that if desired the end wall of the cylinder may be formed similar to the upper face of the adapter plates 26 to receive the valve end directly thereon in sealed relation. In any case, it will be clear that the cylinder end wall serves as a surface or platform means for carrying the valve. It is not necssary, though most advantageous, that an aperture be provided in the end wall for passage of testing fluid to the interior of the valve, since the fluid may be introduced into the valve through other means, so long as the fluid in the valve and in the cylinder means is under substantially the same pressure, as by being supplied from a common source. Other cylinder means of fluid-operated expansible and contractible means suitable for a particular service and of selectively variable effective pressure area may be employed instead of the stepped piston and cylinder arrangement disclosed, although the latter is advantageous because of its simplicity and practically automatic operation.

It will be seen that the invention provides for simple, rapid testing of valves and for great flexibility in types and sizes of valves and in kinds of valve ends which can be accommodated, and that while certain specific embodiments thereof have been disclosed herein, such embodiments may be modified and other embodiments devised, all within the scope of the appended claims.

I claim:

1. Apparatus for pressure testing valves and like articles, comprising a housing and a support therefor, a piston fixed on said support within said housing having a stepped formation providing a reduced end portion thereon, a fluid passage through the piston, a floating cylinder in said housing reciprocable on the piston having an internal stepped formation corresponding to that of the piston, closed expansible chambers defined between the piston and cylinder at said piston end and at each stepped portion, means providing a port extending from each of the chambers through the outer end face of the cylinder end wall, the port of said chamber at the piston end opening substantially centrally through said end face and the ports of the chambers at successively larger stepped portions opening through the end face in radially outwardly spaced relation each within the projection of its respective chamber but outside the projection of the chamber of next smaller diameter, an annular member fitting over said cylinder end wall having in the face adjacent said end face a recess about its aperture of a diameter slightly smaller than the diameter of a selected one of said chambers but sufficiently large to have the port of said selected chamber open into said recess, means on the other face of said annular members for receiving one end of a valve to be tested including a depression about the aperture thereof of diameter smaller than said selected chamber diameter, means in spaced opposed relation to said cylinder for receiving the other end of the valve, a seal between said annular member and cylinder at said recess, a seal in said depression between the valve and annular member, a seal between the valve and said opposed means, and means to effect relative movement of said cylinder and opposed means toward each other for clamping of the valve therebetween.

2. Apparatus for pressure testing valves and like articles of various diameters comprising a support, a piston fixed on said support having stepped portions of diameters successively decreasing from adjacent the support to a reduced end portion, a pressure fluid passage through the piston, a floating cylinder reciprocable on the piston having an internal stepped formation corresponding to that of the piston and defining therewith closed expansible chambers at said piston end and each stepped portion, a seal between the piston and cylinder sealing each of said chambers, means providing a port extending from each chamber opening through the cylinder end wall within the projection thereon of its respective chamber and radially outward of the projection of the next smaller diameter chamber, a plate extending over the cylinder end wall for receiving an end of an article to be tested, a recess in the cylinder-adjacent face of said receiving means having a diameter slightly smaller than that of a selected one of said chambers and sufficient to surround the port opening of said one chamber for placing said one chamber and all chambers of smaller diameter in communication with said aperture, a depression in the other face of the said plate having a diameter slightly smaller than said one chamber diameter for receiving means for sealing an end of such article, a seal in said recess between the receiving means and the cylinder end wall, a seal in the depression between the said plate and such article, means for introducing fluid into such article, pressure fluid supply means common to said piston passage and said introducing means, clamping means in opposed movable relation to the cylinder for receiving the other end of the article, and means for moving the cylinder and clamping means relatively toward and from each other for clamping and releasing an article therebetween.

3. Apparatus for pressure testing valves and like articles, comprising a support, a piston on said support having stepped portions of diameters successively decreasing toward an end thereof, a cylinder reciprocable on the piston having an internal stepped formation corresponding to that of the piston and defining therewith closed expansible chambers at said piston end and each stepped portion, means providing a port extending from each of the chambers opening through the cylinder end wall within the projection thereon of its respective chamber and radially outward of the projection of the next smaller diameter chamber, a plate on said end wall for receiving an end of an article to be tested, a seal between said receiving means and such article, a sealed area defined on said end wall subject to fluid pressure in the article and slightly smaller than the projection on the end wall of a selected one of said chambers extending about the ports of said one chamber and of any chambers of smaller diameter, common means supplying fluid under pressure to the chamber of smallest diameter and the interior of such article, means in spaced opposed movable relation to the end wall for receiving the other end of the article, and means for moving the cylinder and opposed means relatively toward and from each other for clamping and releasing an article.

4. Apparatus for pressure testing valves and like hollow articles, comprising a support, a cylinder housing fixed on said support, a piston fixed in said housing having stepped portions of diameters successively decreasing to a free end thereof, a pressure fluid passage through the piston opening through said free end, a floating cylinder in the housing reciprocable on the piston having an internal stepped formation corresponding to that of the piston and defining therewith a cylindrical expansible chamber at said free end and an annular expansible chamber at each stepped portion, means providing a port extending from each chamber opening through the cylinder end wall within the axial projection thereon of its respective chamber and without the projection of the chamber of next smaller diameter, an annular member on the end wall having an aperture providing communication between the interior of an article to be tested and the port of said cylindrical chamber, a recess in the cylinder-adjacent face of the annular member about said aperture having a diameter slightly smaller than that of a selected one of said chambers and surrounding the port opening of said selected chamber for providing communication between said aperture and said selected chamber and any chambers of smaller diameter, a depression in the other face of the annular member about the aperture of diameter slightly smaller than said selected chamber diameter for receiving means for sealing an end of such article, means mounted on said support for closing the other end of such article axially movable to clamp the article against the annular member, and a seal between the annular member and respectively the article and end wall.

5. Apparatus for pressure testing valves and like articles, comprising a support, a piston fixed on said support having stepped portions of diameters successively decreasing to a free end thereof, a pressure fluid passage through the piston opening at said free end, a cylinder reciprocable on the piston having an internal stepped formation corresponding to the piston and defining therewith expansible chambers at the free end and stepped portions, means providing a fluid passage from each of said chambers opening through the cylinder end wall each within the axial projection thereon of its respective chamber and radially outward of the projection of the chamber of next smaller diameter, plate means on the cylinder end wall for receiving an end of an article to be tested defining an area on the end wall subject to fluid pressure in such article and of diameter slightly smaller than that of a selected one of said chambers encompassing the port of said selected chamber and of any chamber of smaller diameter, means for introducing fluid into such article, pressure fluid supply means common to said piston passage and introducing means, and means for sealingly receiving the other end of such article axially movable to clamp the article against said receiving means.

6. Apparatus for pressure testing valves and like articles, comprising a support, a piston fixed on said support having stepped portions of diameters successively decreasing to a free end thereof, a cylinder reciprocable on the piston and having an internal stepped formation corresponding to the piston and defining expansible chambers therewith, said cylinder including a platform movable therewith, a fluid passage from each one of the chambers opening through said platform each within the axial projection thereon of its respective chamber and radially outward of the projection of the next smaller diameter chamber, means on said platform for receiving an end of an article to be tested comprising sealing means defining on the platform an area subject to fluid pressure in such article and slightly smaller than the axial projection on the platform of a selected one of said chambers including the opening of the passage means of said selected chamber and of any smaller diameter chamber, pressure fluid supply means common to the chamber of smallest diameter and the interior of such article, and means for receiving the other end of such article adjustably movable to clamp the article against said receiving means.

7. Apparatus for pressure testing valves and like hollow articles, comprising a support, a cylinder housing on said support, a piston fixed in said housing having stepped portions of diameters successively decreasing to a free end thereof, a pressure fluid passage through the piston opening at said free end, a floating cylinder in the housing reciprocable on the piston having an internal stepped formation corresponding to the piston and defining therewith a cylindrical expansible chamber at said free end and an annular expansible chamber at each stepped portion, a fluid passage from each one of the chambers opening through the cylinder end wall within the axial projection thereon of its respective chamber and radially outward of the projection of the next smaller diameter chamber, an annular member on the end wall having an aperture providing communication between the interior of an article to be tested and the port of said chamber at the piston free end, a recess in the cylinder-adjacent face of said annular member about said aperture having a diameter slightly smaller than that of a selected one of the chambers and enclosing the port opening of said selected chamber and of any chamber of smaller diameter to provide communication of said aperture therewith, a depression in the other face of the annular member of diameter slightly smaller than said selected chamber diameter for receiving an end of such article, means mounted on said support in spaced opposed relation to the cylinder for closing the other end of such article, and oppositely arranged fluid pressure chambers defined between said cylinder and housing selectively operable for moving the cylinder outwardly and inwardly of the housing for clamping against and releasing from said opposed means such article disposed therebetween.

8. Apparatus for pressure testing valves and like articles, comprising a support, a piston fixed on said support having stepped portions of diameters successively decreasing to a free end thereof, pressure fluid passage means opening through said free end, a cylinder reciprocable on the piston having an internally stepped formation corresponding to the piston and defining therewith expansible chambers at the free end and stepped portions, a passage from each one of said chambers opening through the cylinder end wall each within the axial projection thereon of its respective chamber and radially outward of the projection of the next smaller diameter chamber, plate means on the cylinder end wall for receiving an end of an article to be tested defining in such article on the end wall an area subject to fluid pressure in such article and of diameter slightly smaller than a selected one of said chambers enclosing the port of said selected chamber and of any smaller diameter chamber, means for introducing fluid into such article, pressure fluid supply means common to said fluid passage means and introducing means, means in spaced opposed relation to the receiving means and cylinder for receiving the other end of such article for clamping thereof, and oppositely acting expansible and contractible means for moving the cylinder relative to the housing toward and from said opposed means.

9. Apparatus for pressure testing valves and like articles, comprising a support, a piston fixed on said support having stepped portions of different diameters, a cylinder reciprocable on the piston including a platform movable therewith, said cylinder having an internal stepped formation corresponding to the piston and defining expansible chambers therewith at the stepped portions, a fluid passage extending from each one of the chambers opening through said platform within the axial projection thereon of its respective chamber and radially outward of the projection of the next smaller diameter chamber, means on said platform for receiving an end of an article to be tested comprising a seal defining on the platform an area subject to fluid pressure in such article and slightly smaller than the axial projection on the platform of a selected one of said chambers encompassing the opening of one of the passages of said selected chamber and of any smaller chamber, pressure fluid supply means common to the interior of such article and the chamber of smallest diameter, means in spaced opposed relation to said receiving and platform means for receiving the other end of such article, and means for moving the cylinder toward and from said opposed means for clamping and releasing such article.

10. Apparatus for pressure testing valves and like articles, comprising a support, a first piston fixed on said support, a pressure fluid passage opening through a free end of said piston, a first cylinder reciprocable on the first piston, a cylinder housing on said first cylinder movable therewith, a second piston extending in the housing having stepped portions of different diameters, a pressure fluid passage through said second piston, rigid passage means extending through the end wall of the first cylinder connecting the passages of the pistons and supporting the second piston in spaced relation to the first piston, a second cylinder in said housing engaging on the first cylinder end wall and reciprocable on the second piston having an internal stepped formation corresponding to the piston and defining therewith expansible chambers at the stepped portions, means providing a passage extending each from one of said chambers opening through the end wall of the second cylinder within the axial projection thereon of its respective chamber and without the projection of any smaller chamber, a plate member on the second cylinder end wall for receiving an end of an article to be tested and having an aperture affording communication between the interior of such article and the port opening of at least the smallest diameter chamber, a recess about the aperture in the cylinder-adjacent face of said member having a diameter slightly smaller than that of a selected one of the chambers and encompassing the port opening of said selected chamber and of any smaller diameter chamber, a depression in the other face of said apertured plate member about the aperture of slightly smaller diameter than said selected chamber to receive means for sealing said end of such article, means in clamping relation with the apertured plate member mounted on the support for engaging the other end of such article axially movable relative to the cylinders and apertured member, and means for moving the first cylinder and clamping means relatively toward each other to clamp such article between the clamping means and apertured plate member.

11. Apparatus for pressure testing valves and like articles, comprising a support, a first piston fixed on said support, a pressure fluid passage opening through a free end of said piston, a first cylinder reciprocable on said piston having an opening through the end wall thereof axially aligned with said passage, a second piston fixed to the first piston in axially spaced relation having stepped portions of different diameters, a pressure fluid passage through the second piston opening at the free end thereof, means extending through said end wall opening placing said fluid passages of the pistons in communication, a second cylinder engaging with said first cylinder end wall and reciprocable on the second piston having internal stepped portions corresponding to the stepped portions of said piston and defining expansible chambers therewith, means providing a passage extending from each one of said chambers opening through the end wall of said second cylinder within the projection thereon of its respective chamber and without the projection of the chamber of next smaller diameter, means on said second cylinder end wall for receiving an end of an article to be tested and defining on said second cylinder end wall an area subject to fluid pressure in such article of diameter slightly smaller than a selected one of the chambers encompassing the port opening of said selected chamber and of any smaller diameter chamber, means for introducing fluid into such article, pressure fluid supply means common to said piston passage and introducing means, means in opposed spaced relation to and axially movable relative to said cylinders and receiving means for engaging the other end of such article, and means for moving the first cylinder and said engaging means relatively toward and from each other to clamp and release such article between the engaging and receiving means.

12. Apparatus for pressure testing valves and like articles, comprising a support, a piston fixed on said support having stepped portions of different diameters, expansible and contractible chamber means on said support including a platform movable therewith axially toward and from said piston, a cylinder engageable by said platform reciprocable on the piston having internal stepped portions corresponding to the stepped portions of the piston and defining expansible chambers therewith, means providing ports extending each from one of the chambers opening through the end wall of said cylinder within the axial projection thereon of its respective chamber and radially outward of the projection of any smaller diameter chamber, means on said end wall for receiving an end of an article and defining on the end wall an area subject to fluid pressure in such article slightly smaller than the area of a selected one of said chambers plus that of any smaller diameter chamber and encompassing the port of said selected chamber and of any smaller diameter chamber, common means supplying pressure fluid to the interior of such article and the chamber of smallest diameter, means in spaced opposed relation to said receiving means for engaging the other end of such article, and means for moving the expansible and contractible chamber means toward and from said engaging means to clamp and release such article between the engaging and receiving means.

References Cited in the file of this patent
UNITED STATES PATENTS

| | | |
|---|---|---|
| 1,973,674 | Rosenkranz | Sept. 11, 1934 |
| 2,196,317 | Longstreet | Apr. 9, 1940 |
| 2,231,807 | Hybarger | Feb. 11, 1941 |
| 2,426,406 | Meyers | Aug. 26, 1947 |
| 2,705,888 | Sedgwick | Apr. 12, 1955 |